W. B. HARSEL.
MOLD CUTTING MECHANISM.
APPLICATION FILED SEPT. 8, 1919.
1,438,159.
Patented Dec. 5, 1922.
4 SHEETS—SHEET 4.
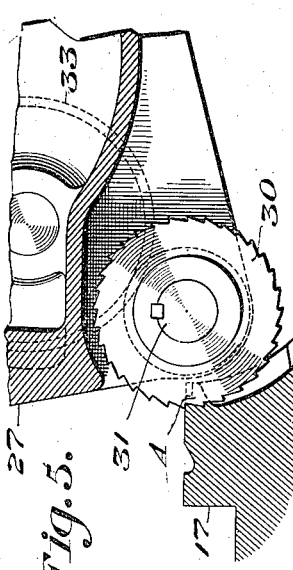
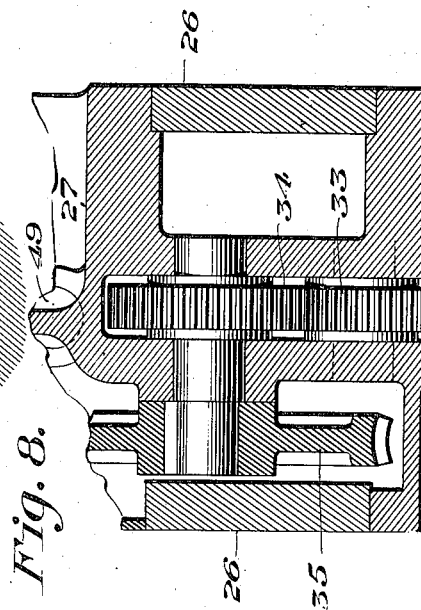
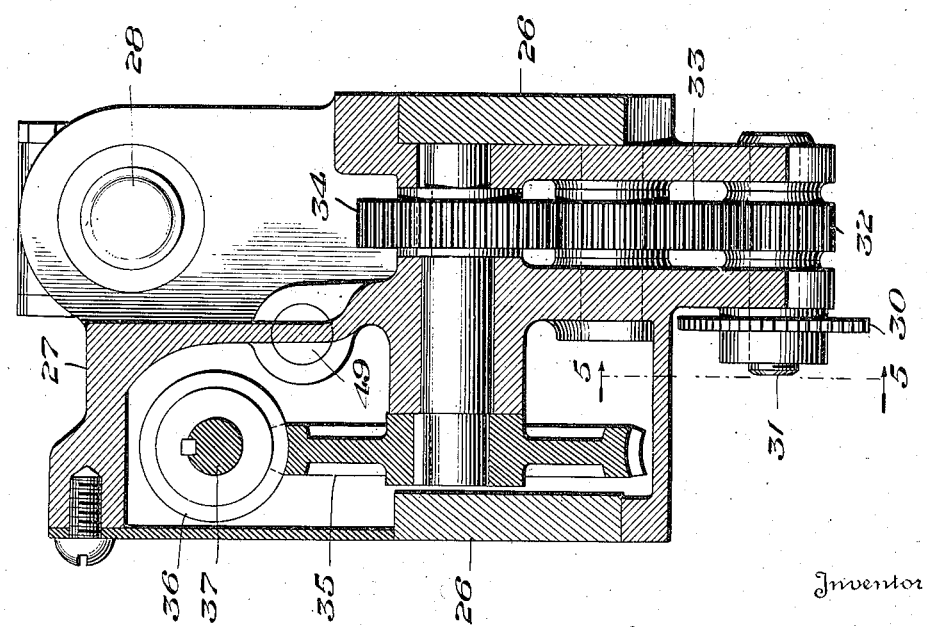
Inventor
William B. Harsel
By
Attorney Patented Dec. 5, 1922.

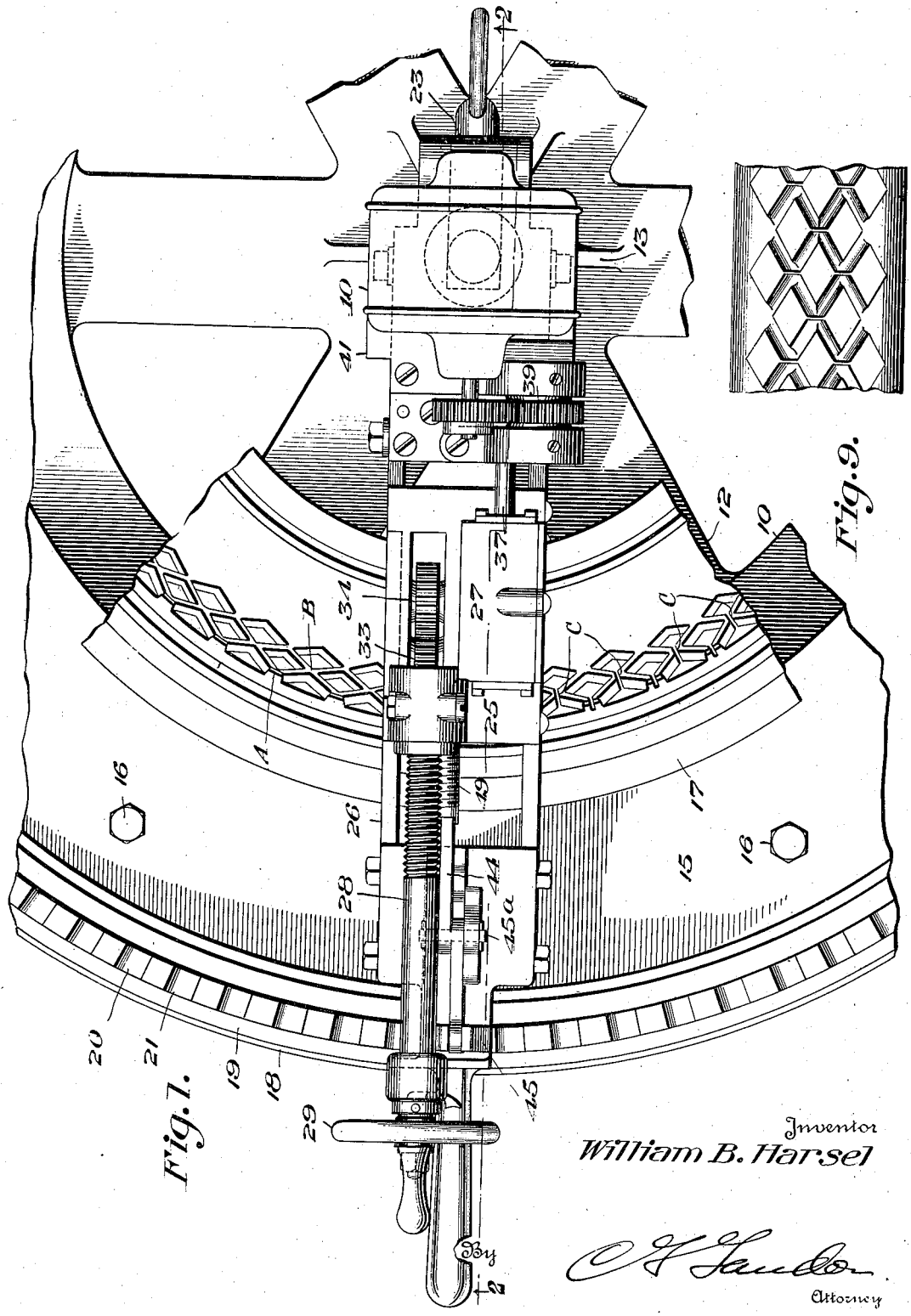

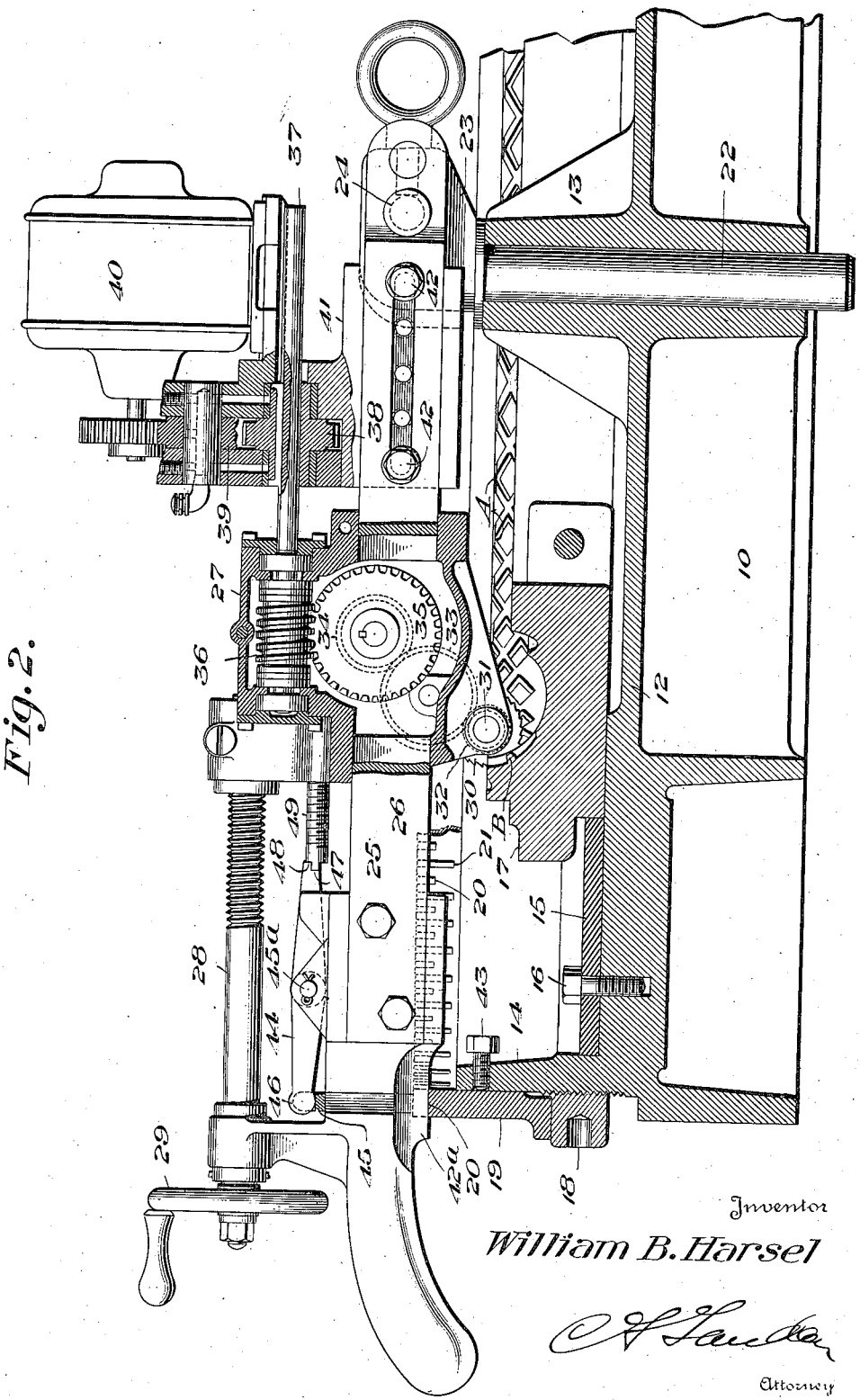

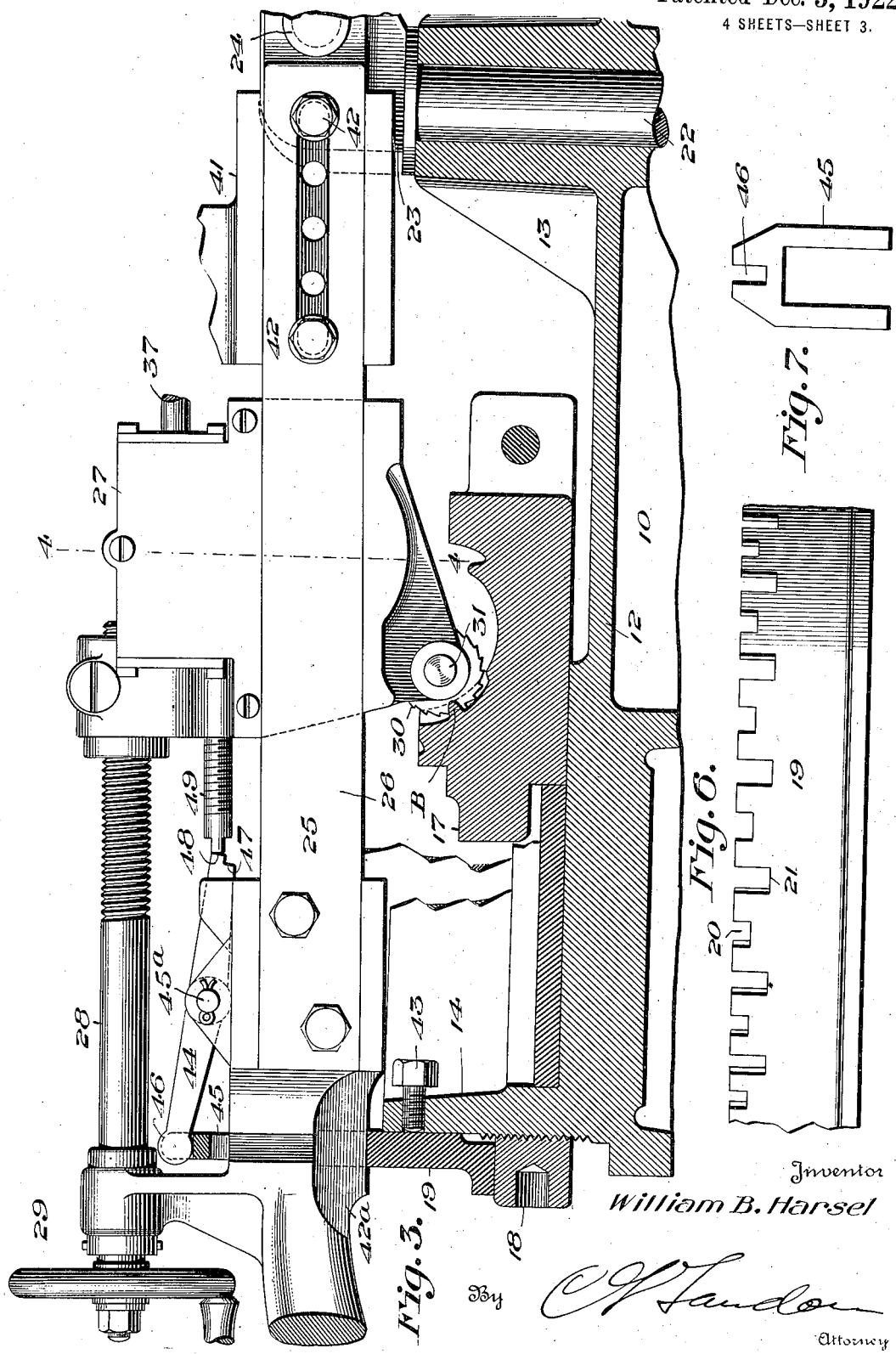

1,438,159

UNITED STATES PATENT OFFICE.

WILLIAM B. HARSEL, OF AKRON, OHIO, ASSIGNOR TO THE GOODYEAR TIRE & RUBBER COMPANY, OF AKRON, OHIO, A CORPORATION OF OHIO.

MOLD-CUTTING MECHANISM.

Application filed September 8, 1919. Serial No. 322,371.

*To all whom it may concern:*

Be it known that I, WILLIAM B. HARSEL, a citizen of the United States, and resident of Akron, Ohio, have invented new and useful Improvements in Mold-Cutting Mechanisms, of which the following is a specification.

The present invention relates to improvements in cutting mechanisms for use in cutting the veins in molds used in the manufacture of non-skid tires for vehicles, or the like, and is particularly applicable to that type of mold used in manufacturing what is known as the "all weather" tread tire, the design of which consists of diamond-shaped protuberances on the surface thereof.

In the process of molding the non-skid portion of the tread of a tire, the design of which is impressed by means of numerous upstanding dies or ridges on the interior of the mold surface, it is the present practice to make provision for the expansion of the softened rubber under compression, by cutting veins to connect the depressions of the molds and thereby provide paths into which the rubber when softened and compressed may run. Heretofore the cutting or "veining" as it is commonly known, has been done by hand, in a laborious and often inaccurate manner, such inaccuracy resulting in consequent mutilation of the tire tread, and so far as I am aware no mechanism has been perfected for specifically performing this operation.

The object of the present invention, therefore, is to provide a practical mechanism whereby the previously described operation may be performed in a manner involving the minimum amount of time and labor, and by means of which the depth and position of the cuts may be properly gaged to prevent mutilation of the tread surface of the mold and the tire made therewith.

It is a further object of the invention to provide a mechanism capable of operation upon various sizes and types of molds and for this purpose a cutter element, preferably of the rotary type, is used and various mechanical devices are associated therewith, whereby the cutter may be adjusted to cut in any one of a plurality of horizontal zones and in different vertical planes as desired, and as hereinafter described in detail.

With the above and other objects in view, the invention resides in the particular arrangement and combination of the instrumentalities more completely set forth in the following description and illustrated in the accompanying drawings, certain features of construction and combination of parts for which protection is desired, being assembled and pointed out in the appended claims forming a part of this specification.

In the drawings illustrating a practical embodiment of the invention:

Figure 1 is a top plan view of a portion of the machine showing a fragment of a mold positioned therein;

Figure 2 is a transverse sectional view with parts shown in elevation taken on the line 2—2 of Fig. 1;

Figure 3 is a similar section on an enlarged scale illustrating the parts in different positions from those shown in Fig 2;

Figure 4 is an enlarged detail transverse section on the line 4—4 of Fig. 3;

Figure 5 is an enlarged detail fragmentary section on the line 5—5 of Fig. 4, showing the cutter positioned in relation to a portion of the mold;

Figure 6 is an elevation of a fragment of the annular retaining member;

Figure 7 is a detail of the stop mechanism;

Figure 8 is an enlarged fragmentary section of a modified form of cutter; and

Figure 9 is a fragmentary plan view of the finished tire tread.

Referring to the drawings, the numeral 10 designates the base of the machine which is preferably, though not necessarily, circular in shape and comprises a table 12, a centrally located hub member 13, and a vertical annular flange 14 surrounding the outer edge of the table. A spacer ring 15 is shown clamped to the table 12 at 16 and is designed to properly position a mold section 17 thereon during the veining or cutting operation. An annular adjusting ring 18 is threaded upon the vertical annular flange 14 adjacent the base thereof and serves to sustain an annular member 19. The member 19 is provided with a series of alternately shallow and deep notches, 20 and 21 respectively, that are spaced equidistantly around the upper edge of the annular rack member, for a purpose hereinafter set forth.

A pivot pin 22 is mounted within the centrally located hub member 13, and is provided at its upper end with a head portion 23. Mounted by means of a stud 24 to swing vertically from the head 23 of the pivot pin or stud 22, is an operating arm designated as a whole by the numeral 25. The operating arm 25 is designed to carry and serve as a mounting for the major part of the mechanism and by virtue of the stud 24 is capable of being swung circumferentially above the table 12 and mold 17 for a purpose presently apparent.

Mounted between guide bars 26 of arm 25 is a carriage 27 constructed for lateral adjustment along the guides 26 by means of a screw 28 and hand wheel 29. A rotary cutter 30 is mounted adjacent the lower and forward portion of the carriage 27 upon a shaft 31, and is driven by a train of gears 32, 33, 34. The gear train in turn receives motion from a worm wheel 35, and a worm 36, the latter being fast upon a driven shaft 37 that is journaled in the upper portion of the carriage 27. All of this drive mechanism is carried upon or within the carriage 27, and moves with the same laterally along the arm 25. The shaft 37 projects rearwardly from the carriage 27, and has splined upon the outer end thereof a gear 38 which through an idler gear 39 is driven by a motor 40. The motor 40, and gears 38 and 39 are carried upon a bracket 41 adjustably secured upon the rear of the arm 25 by means of bolts 42.

By referring particularly to Fig. 1 of the drawings, it will be seen that the intersections of the dies or ridges in the mold to be cut occur in series circumferentially around the mold, the intersection of each series occurring in different vertical planes and in alternately different horizontal zones. Obviously, therefore, it is necessary to adjust the cutter circumferentially and with each circumferential adjustment said cutter must be moved vertically to properly register the cutter with each different series of intersections and with these ends in view the alternate shallow and deep notches 20 and 21 previously mentioned are provided upon the annular ring 19, the shallow notches 20 being spaced in radial alignment with the upper series of intersecting dies or ridges and the deep notches 21 in like radial alignment with the intersecting dies or ridges in the lower series. By means of the previously described stud 22 the arm 25 carrying with it the cutter 30 and its component parts may be swung to properly register the cutter circumferentially, said arm 25 being raised or lowered as desired upon the stud 24, and retained within the desired notch 20 or 21 by any suitable means such as has been illustrated at 42ª.

Set screws, one of which is shown at 43, serve to retain the circular ring 19 in position to properly align the notches 20 and 21 with the points of intersection of the series of veins.

In order to insure the proper depth of cut in either series of intersecting veins a novel combined stop and gage device has been provided consisting of the following elements:

A rocker arm 44 is pivotally mounted upon the forward end of the operating arm 25, the forward end of the former engaging in a notch 46 of a yoke member 45. Yoke member 45 straddles the operating arm 25, is guided for vertical movement with respect thereto, and normally rests upon the upper edge of the annular member 19. At its rear end the rocker arm 44 is under cut to form abutments 47 and 48 that are designed to contact with an adjustable stop member 49 which is carried upon the forward end of the carriage 27.

In Fig. 8 of the drawings a modified form of cutter has been illustrated comprising double cutter elements 30ª which are fixed upon a driven shaft 31ª, it being within the contemplation of the invention to expedite the veining operation by the employment of a plurality of cutting elements if desired.

The operation of the invention is as follows:

The arm 25, together with the parts carried thereby, is raised to a vertical position upon the stud 24, or if desired it may be removed as a unit from the base 10 by withdrawing the pivoted stud 22 from the hub 13. A mold section may then be placed upon the table, it being understood that various sizes of spacer rings 15 may be provided for different diameters of molds. The notched ring 19 is then positioned by means of the adjusting ring 18 and set screws 43 to radially align the shallow and deep notches 20 and 21 with the intersecting core dies or ridges, it being obvious that different types of rings may be substituted for varying sizes and types of tires. The operating arm 25 is then lowered and the forward end thereof engaged with any one of the shallow notches 20, thereby radially aligning the cutter 30 with one of the intersections of the upper series A of dies or ridges in the mold. In this position the yoke member 45 rocks the arm 44 upon the pivot 45ª to position the abutment 47 in alignment with stop member 49. The power is then applied and the carriage moved forward by means of the screw 28 and hand wheel 29 to feed the cutter forward until the adjustable stop 49 contacts with the abutment 47. By means of the hand wheel 29 the cutter 30 is withdrawn from the cut or vein C thus formed. The operating arm is raised on the stud 24, turned on the stud 22, and engaged in the next deep notch 21, thereby positioning said cutter with respect to the lower series of intersections B. In this position the rocker arm 44 is depressed at its inner end to align abutment 48 with the adjustable stop 49 and the cutter 30 is again fed forward as previously described until the stop 49 contacts with the abutment 48. By adjusting the stop 49 the depth of cut may be gaged as required and the wear of the parts taken up.

From the foregoing, it will be apparent that an efficient and practical mechanism has been devised for effecting the required movements of a cutter element, relative to the tread of tire molds of various sizes and types, together with novel means for arresting the movement of the cutter for properly gaging the depth of the cut, and it is to be understood that, while a simple and preferred type of mechanism has been herein shown and described, various changes in structure and modifications of parts may be made without departing from the spirit of the invention as defined by the claims hereto appended.

What I claim is:

1. An apparatus of the class described, comprising in combination, a support for an object annular in shape, a cutting mechanism arranged to effect spaced radially disposed cuts in said object, and means whereby the mechanism may be adjusted to cut in different series.

2. An apparatus of the class described, comprising in combination, a support for an annular object to be cut, a cutting mechanism arranged to effect spaced radially disposed cuts in said object, means whereby the mechanism may be adjusted to cut alternately in different series, and devices adapted to operate through such adjustment to gage the depth of the cuts in each series.

3. A mold tread cutting machine comprising, in combination, a support for a mold of annular shape, means for positioning a mold thereon, a cutter mechanism adapted for adjustment to cut with respect to the mold in different radial vertical planes and in different horizontal zones, means for gaging the depth of the cut, and mechanism for actuating said cutter.

4. An apparatus of the class described comprising, a support for an annular object, a cutter element, a mounting for the cutter element adapted for adjusting the cutter arcuately in a vertical plane and circumferentially of the object, means upon the mounting for feeding the cutter element into operative relation with respect to the object, and means for holding the mounting against movement circumferentially of the object.

5. An apparatus of the class described comprising, a support for an annular object, a cutter element, a mounting for the cutter element adapted for adjusting the cutter element arcuately in a vertical plane and circumferentially of the object, means upon the mounting for moving the cutter element radially of the object, and means adapted to limit such radial movement.

6. An apparatus of the class described comprising, a support for an annular object, a cutter element, a mounting for the cutter element adapted for adjusting the element in a vertical plane and circumferentially of the object, and devices adapted for effecting an equi-distant spacing of the element in its adjustment circumferentially of the object.

7. An apparatus of the class described comprising, a support for an annular object, a cutter element, a mounting for the cutter adapted for adjusting it arcuately in a vertical plane and circumferentially of the object, means upon the mounting for moving the cutter element radially of the object, means adapted to limit such radial movement, and devices adapted for effecting an equi-distant spacing of the element in its adjustment circumferentially of the object.

8. An apparatus of the class described comprising, a support for an annular object, a cutter element, a mounting for the cutter element adapted for adjusting it arcuately in a vertical plane and circumferentially of the object, and devices adapted to alternately hold the mounting in raised and lowered position during its adjustment circumferentially of the object.

9. An apparatus of the class described comprising, a support for an annular object, a cutter element, a mounting for the cutter element adapted for adjusting the element arcuately in a vertical plane and circumferentially of the object, devices adapted to alternately hold the mounting in raised and lowered position as it is adjusted circumferentially of the object, means for moving the cutter element radially of the object, and devices adapted to automatically limit such radial movement in varying degrees in accordance with the raised or lowered position of the mounting.

In witness whereof, I have hereunto signed my name in the presence of two subscribing witnesses.

WILLIAM B. HARSEL.

Witnesses:
J. E. KEATING,
PHILIP E. BARNES.